UNITED STATES PATENT OFFICE.

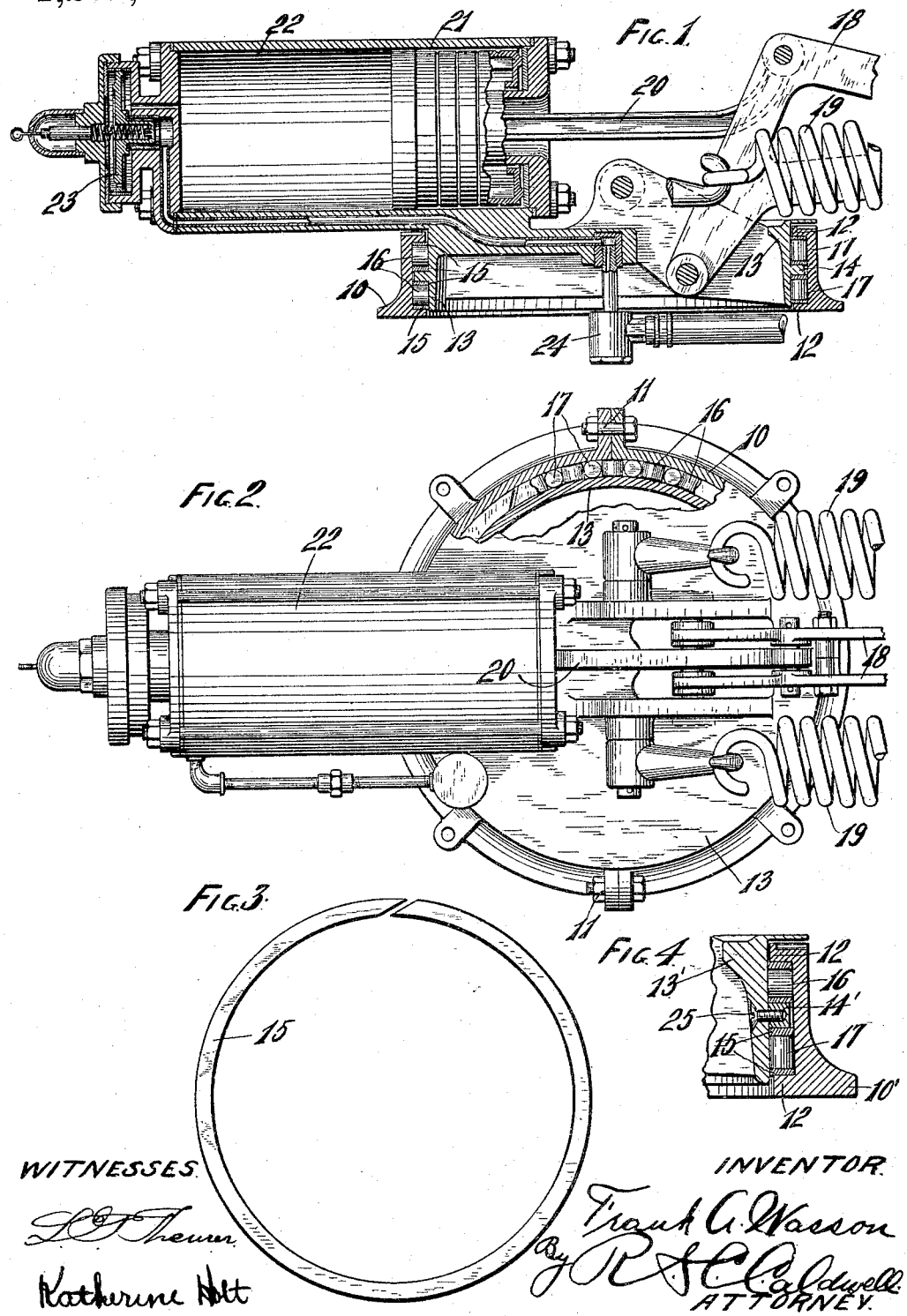

FRANK A. WASSON, OF MILWAUKEE, WISCONSIN, ASSIGNOR TO WASSON ENGINEERING AND SUPPLY COMPANY, OF MILWAUKEE, WISCONSIN, A CORPORATION OF WISCONSIN.

ANTIFRICTION TROLLEY-BASE.

1,202,930.   Specification of Letters Patent.   Patented Oct. 31, 1916.

Application filed February 26, 1915. Serial No. 10,692.

*To all whom it may concern:*

Be it known that I, FRANK A. WASSON, a citizen of the United States, and resident of Milwaukee, in the county of Milwaukee and State of Wisconsin, have invented new and useful Improvements in Antifriction Trolley-Bases, of which the following is a description, reference being had to the accompanying drawings, which are a part of this specification.

This invention has for its object to provide a trolley base with a freely moving bearing having renewable bearing surfaces, and being capable of carrying the current, and forming the connector between the stationary and movable parts without danger of pitting the bearing rollers or their raceway.

Another object of the invention is to provide such an anti-friction trolley base which at all points of its swivel mounting is protected against frictional binding from a tendency to move upwardly, as well as from a tendency to move downwardly, and thus be capable of resisting the tilting stress to which the base is subjected when in use either by the action of the trolley spring or the action of the trolley retriever.

Another object of the invention is to provide such an anti-friction trolley base with vertical spacing rollers interposed between the horizontal end thrust rollers to take the lateral or side thrust of the trolley base.

With the above and other objects in view the invention consists in the anti-friction trolley base as herein claimed, and all equivalents.

Referring to the accompanying drawings in which like characters of reference indicate the same parts in the different views, Figure 1 is a sectional elevation of an anti-friction trolley base constituting an embodiment of this invention; Fig. 2 is a plan view thereof; Fig. 3 is a detail view of one of the renewable bearing rings; and, Fig. 4 is a sectional detail view of a modified form of the invention.

In these drawings 10 indicates a stationary ring or casing, preferably formed in half sections bolted together at 11, as shown, and provided with top and bottom inwardly projecting flanges 12. The trolley base proper 13 is of a cylindrical shape to loosely fit within the ring 10 and is provided with a central horizontal outwardly projecting flange 14 positioned between the flanges 12. Flat split rings 15, preferably of hard metal to resist wear, and with their ends scarfed to avoid a break in the bearing surface afforded thereby, are sprung into place against the faces of the flanges 12 and 14 respectively, and cylindrical or slightly tapered bearing rollers 16 fit between the bearing rings 15 above and below the flange 14, said rollers being of a length to just fit in the space between the base proper 13 and the ring 10. Spacing rollers 17 are also contained in this space and are positioned between the rollers 16 and stand on end with their axes vertical so as to bear against the cylindrical surface of the base 13 and the stationary ring 10 respectively and their ends closely fit against the top and bottom bearing rings 15.

The base 13 has pivotally mounted on it the trolley pole 18 forced upwardly against the wire by a spring 19 as usual, and as here shown is connected by a connecting rod 20 with a piston 21 in a cylinder 22 mounted on the base 13 and constituting a trolley retriver operated by compressed air controlled by an automatic valve 23 and admitted through a swivel air joint 24 at the center of the base, all as covered by my co-pending application Serial Number 767,016, filed May 12, 1913.

In operation the rollers 16 below the flange 14 take the downward pressure at any point of the base, while the rollers 16 above the flange 14 take the upward pressure thereof at points diametrically opposite, so that the tendency of the base to tilt is resisted by the roller bearings, while maintaining the freedom of rotary movement thereof to permit the trolley to swing easily from side to side to follow the wire in rounding curves. This bearing besides taking the end thrust also takes the lateral or side thrust of the rotatable base by means of the vertical spacing rollers 17, and the two sets of rollers 16 and 17 afford numerous points of contact or lines of contact between the rotary base and the stationary ring, aggregating a sufficient area of contact to readily carry the current without arcing or pitting the rollers or their bearing surfaces. The wear of the hardened steel rollers and the bearing rings 15 is slight, but when it becomes necessary to replace the worn parts this may be readily done by disconnecting the two sections of the ring 10 and removing the base therefrom, when it is a simple matter to substitute new bearing rings and rollers and reassemble the device.

With the modification of the invention shown in Fig. 4 such renewal may be accomplished without separating the stationary ring 10' which may, therefore, be made in one casting instead of in half sections as before, for the flange 14' is here made separate from the base 13' in the form of a removable ring held in place by screws 25. By removing the screws 25 the base 13' may be lifted from the ring 10', and new parts substituted for the worn parts. When, however, the sectional base 10 is used in connection with the removable flange 14' there is no necessity for splitting the bearing rings 15, for after removing the base in the manner just described the ring 10 may be separated to permit the bearing rings to be removed without the necessity for their being contracted or expanded.

It is obvious that the flanges on the stationary ring and on the base member may be transposed so that the stationary ring has the single intermediate flange and the base member has the upper and lower flanges, and such transposition of parts is intended to be included by the claims.

What I claim as new and desire to secure by Letters Patent is:

1. An anti-friction trolley base, comprising a stationary ring having upper and lower inwardly projecting flanges, a rotatable base member fitting within the stationary ring and provided with an outwardly extending flange positioned between the flanges of the stationary ring, and horizontal cylindrical anti-friction rollers fitting within the spaces between the flanges of the base member and the flanges of the stationary ring with their axes radial to the axis of rotation of the base member.

2. An anti-friction trolley base, comprising a stationary ring having upper and lower inwardly extending flanges, a rotary base member fitting within the stationary ring and having an outwardly extending flange positioned between the flanges of the stationary ring, horizontal cylindrical anti-friction rollers contained in the spaces between the flanges of the base member and the stationary ring, and vertical cylindrical rollers interposed between the horizontal rollers and bearing against the walls of the base and the stationary ring respectively.

3. An anti-friction trolley base, comprising a stationary ring having upper and lower inwardly projecting flanges, a rotary base member within the ring having an outwardly extending flange positioned between the flanges of the stationary ring, removable contracting split bearing rings seated against the flanges of the stationary ring and the base member respectively, and horizontal anti-friction rollers between the bearing rings with their axes radial to the axis of rotation of the base member.

4. An anti-friction trolley base, comprising a stationary ring having upper and lower inwardly projecting flanges, a rotary base member having an outwardly extending flange positioned between the flanges of the stationary ring, removable contracting split bearing rings seated against the flanges of the rotary base and the stationary ring, horizontal anti-friction rollers between the bearing rings with their axes radial to the axis of rotation of the base member, and vertical anti-friction rollers interposed between the horizontal anti-friction rollers and bearing against the walls of the stationary ring and the base member respectively.

5. An anti-friction trolley base, comprising a sectional stationary ring having upper and lower inwardly projecting flanges, a rotary base member within the ring having an outwardly extending flange fitting between the flanges of the ring member, and anti-friction means fitting between the flanges of the stationary ring and the base member respectively.

6. An anti-friction trolley base, comprising a stationary ring having inwardly projecting upper and lower flanges, a rotary base member within the ring, a flange member detachably secured to the base member and positioned between the flanges of the stationary ring, and anti-friction devices between said detachable flange and the flanges of the stationary ring.

In testimony whereof, I affix my signature, in presence of two witnesses.

FRANK A. WASSON.

Witnesses:
KATHERINE HOLT,
MARGARET FORRESTAL.